(12) United States Patent
Chue et al.

(10) Patent No.: US 7,184,230 B1
(45) Date of Patent: Feb. 27, 2007

(54) SYSTEM AND METHOD FOR PROCESSING TRACK IDENTIFIER ERRORS TO MITIGATE HEAD INSTABILITY IN DATA STORAGE DEVICES

(75) Inventors: Jack M. Chue, Los Altos, CA (US); Jai N. Subrahmanyam, Santa Clara, CA (US); Russ A. Quisenberry, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 281 days.

(21) Appl. No.: 10/160,954

(22) Filed: Jun. 1, 2002

(51) Int. Cl.
   *G11B 5/02* (2006.01)
(52) U.S. Cl. .................................................. 360/25
(58) Field of Classification Search ............... 360/25
   See application file for complete search history.

(56) References Cited

U.S. PATENT DOCUMENTS

| | | | | |
|---|---|---|---|---|
| 5,268,800 A | * | 12/1993 | Nielsen | 360/77.04 |
| 5,434,673 A | * | 7/1995 | Inoue et al. | 386/95 |
| 5,589,998 A | * | 12/1996 | Yu | 360/78.14 |
| 5,920,440 A | * | 7/1999 | Bang | 360/51 |
| 6,185,717 B1 | * | 2/2001 | Fukunaga et al. | 714/777 |
| 6,226,138 B1 | * | 5/2001 | Blaum et al. | 360/48 |
| 6,304,398 B1 | * | 10/2001 | Gaub et al. | 360/77.08 |
| 6,754,019 B2 | * | 6/2004 | Tokizono et al. | 360/53 |

* cited by examiner

*Primary Examiner*—Wayne Young
*Assistant Examiner*—Glenda P. Rodriguez
(74) *Attorney, Agent, or Firm*—Jonathan E. Prejean, Esq.; Blakely Sokoloff Taylor & Zafman (57) ABSTRACT

A system and method for processing track identifier errors to mitigate head instability in data storage devices is disclosed. The system and method includes computing a track id differential between an expected track id and a received track id, encoding the expected track id and the received track id, initiating a first action if the track id differential exceeds a pre-determined threshold and the encoded expected track id varies from the encoded received track id by a pre-configured number of bits, and initiating a second action if the track id differential does not exceed the pre-determined threshold or the encoded expected track id does not vary from the encoded received track id by a pre-configured number of bits.

16 Claims, 6 Drawing Sheets

SYSTEM AND METHOD FOR PROCESSING TRACK IDENTIFIER ERRORS TO MITIGATE HEAD INSTABILITY IN DATA STORAGE DEVICES

BACKGROUND OF THE INVENTION

1. Field of the Invention

The present invention relates to the field of data storage and retrieval devices. In particular, the present invention relates to the mitigation of head instability in such devices.

2. Description of the Prior Art

As the data storage industry has pushed towards higher and higher data storage densities, the magneto-resistive (MR) sensor sensitivity has progressively increased with a concomitant decrease in the sensor size to support higher tracks per inch (TPI) requirements. These changes have made the data reader sensitive to noise phenomena which are manifestations of kinks and loops (also called bifurcation loops) that are present in the media field range of the MR transfer curve. The loops and kinks in the transfer curve, which give rise to the observed head instability, are eventually classified as baseline popping (BLP), permanent magnet reversal instability (PMRI), spiking noise, writer instability, or random telegraph noise (RTN). The observed effect in all head instability cases is extra pulses, missing pulses and thermal asperity (TA) like events whose time constant is related to the alternating current (AC) coupling capacitor in the preamplifier. Any external factor that changes the kinks and loops in the transfer curve or the location of the same on the MR transfer curve could result in the disappearance or reappearance of spikes and BLP events. Whenever these bifurcation loops occur in the media field sweep range, instability can occur due to thermal excitation that causes jumps to either side of the bifurcation loop in the transfer curve. When the jumps occur to one side of the bifurcation loop (which is enclosed by the media field range while the other side is not), it results in positive or negative spikes. When the bifurcation loop is completely enclosed by the media field range, it causes a random baseline shift that is the result of jumps from one side of the loop to the other due to thermal excitation.

Bias current level, temperature, mechanical stress resulting from the head fabrication processes, and time all have an effect on the MR transfer curve and the location of loops and kinks within the transfer curve. As has been mentioned previously, problems only occur when the loops and kinks lie within the media field sweep range. Because the loops shift around and may move outside the media field range at certain bias current temperature levels, it is possible that at certain temperature and bias current ranges, the head is impervious to the aforementioned instability phenomena. The time constant and the nature of these jumps determine whether they affect drive performance. The servo pattern in the drive usually bears the brunt of the effects of the instability.

Although the root causes of head instability are well known, it is difficult to screen for the phenomena effectively at any given stage of the drive fabrication process without compromising good heads. In the prior art, a combination of techniques can be used to cope with head instability.

The various conventional techniques that can be used to deal with head instability cover a broad spectrum of solutions from screening at the head level to adjusting the channel response. Screening measures attempt to eliminate head instability whereas other techniques attempt to deal with head instabilities through changes to the drive manufacturing process or various drive adjustments. A few of these conventional techniques include the following:

1. Head Screening—HSA or HGA level screen that uses the magnetic transfer curve to look for loop anomalies.
2. Temperature Sensitive Bias and Write Current Optimization—Optimizes the bias and write current over a range of temperatures to find write current and bias settings which are less prone to instability.
3. Adjusting the preamp AC coupling capacitance—A method of adjusting the time constant of the head instability to help the drive cope with the instabilities.
4. Adjust the High pass pole of the Partial Response system—A method to track out low frequency head instability events by adjusting the High pass pole of the band-pass Partial Response transfer function.

Although these prior art techniques have some effect in dealing with head instability, a less expensive and more reliable solution is needed.

SUMMARY OF THE INVENTION

A system and method for processing track identifier errors to mitigate head instability in data storage devices is disclosed. The system and method includes computing a track id differential between an expected track id and a received track id, encoding the expected track id and the received track id, initiating a first action if the track id differential exceeds a pre-determined threshold and the encoded expected track id varies from the encoded received track id by a pre-configured number of bits, and initiating a second action if the track id differential does not exceed the pre-determined threshold or the encoded expected track id does not vary from the encoded received track id by a pre-configured number of bits.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

A system and method for processing track identifier errors to mitigate head instability in data storage devices is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, circuits, processes and interfaces have not been shown or described in detail in order not to unnecessarily obscure the present invention.

Figure 1:
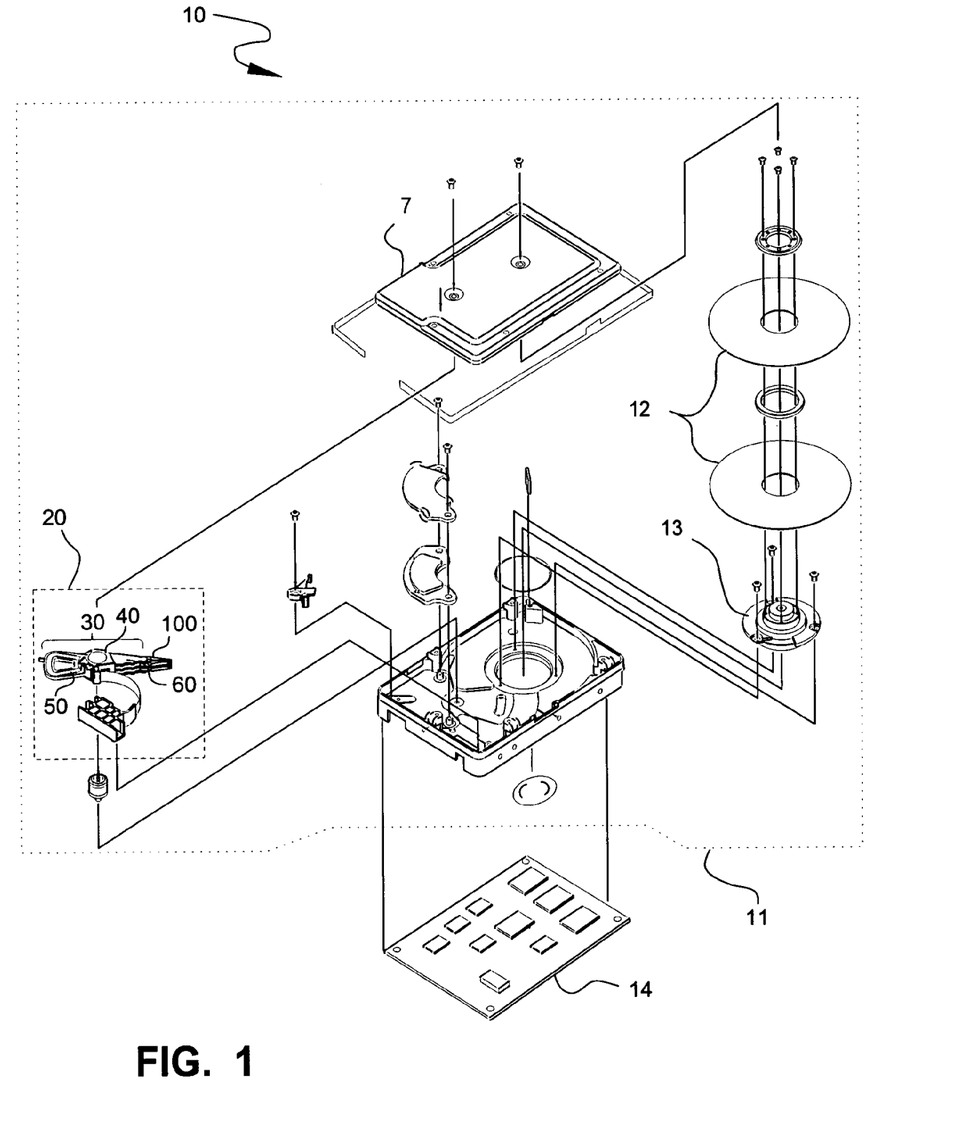
FIG. 1 illustrates the principal components of a conventional disk drive.

FIG. 1 shows the principal components of a conventional disk drive 10 in which a method according to the present invention may be implemented. The disk drive 10 shown is an integrated drive electronics (IDE) drive, comprising a head disk assembly (HDA) 11 and a controller circuit board 14.

The HDA 11 of FIG. 1 comprises a magnetic disk 12 (two disks shown), a spindle motor 13 for rapidly rotating the disk 12, and a head stack assembly 20 located next to the disk 12. The head stack assembly 20 comprises a swing-type actuator assembly 30 having a voice coil 50, an actuator body 40, and an actuator arm 60. At least one head gimbal assembly 100 extends from each actuator arm 60 and carries a head 140 (see FIG. 1A) over the disk 12.

The head stack assembly 20 is located so that the head 140 of the head gimbal assembly 100 is biased towards and moveable over the disk 12. The HDA's storage capacity may be increased, as shown in FIG. 1, by including several disks 12 and by providing a head stack assembly 20 having a vertical "stack" of head gimbal assemblies 100 and associated heads 140 for each surface of each disk 12, the head gimbal assemblies 100 supported by multiple actuator arms 60.

Figure 1A:
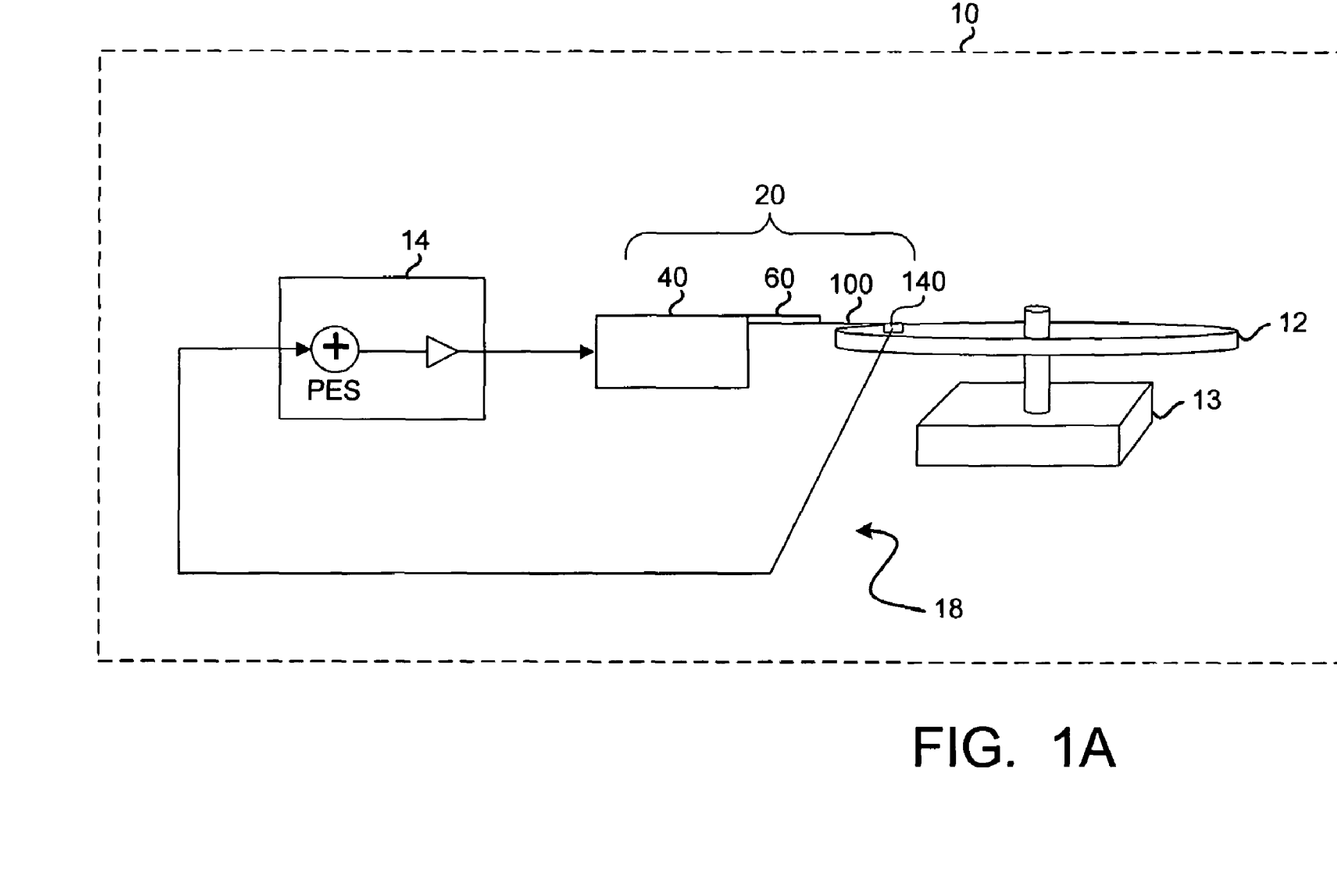
FIG. 1A illustrates a block diagram of a servo control loop in a conventional disk drive.

FIG. 1A is a schematic, block diagram of a servo control loop 18 used to position a transducer head 140 over a surface of a disk 12 in the disk drive 10 of FIG. 1. As suggested therein, servo electronics within the controller circuit board 14 control the actuator 20 based on servo signals fed back from the transducer head 140 as it passes over the servo wedges. A detailed description of the servo control loop is unnecessary because its general operation is well known in the industry.

Figure 1B:
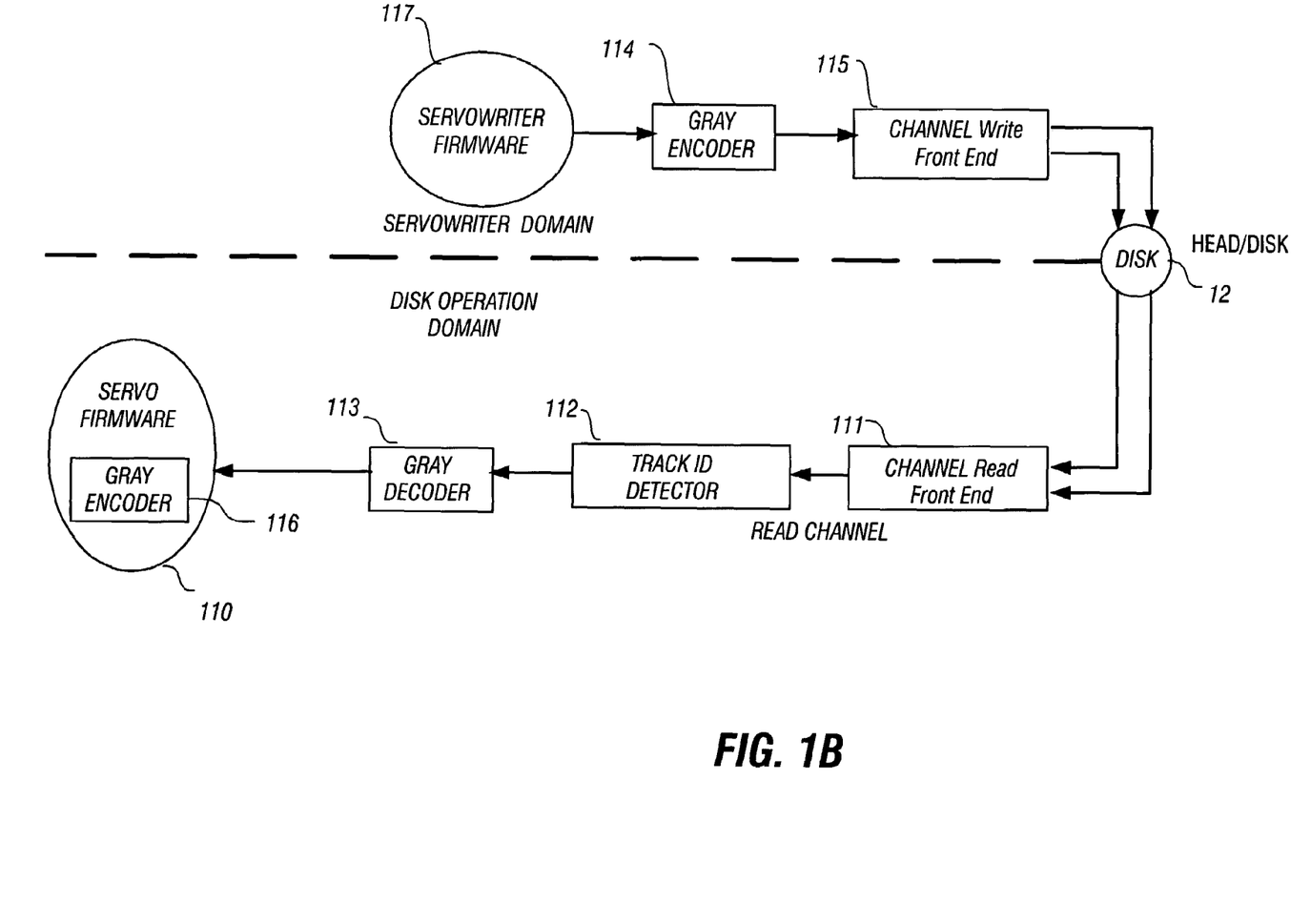
FIG. 1B illustrates the servo track identifier (id) detection system of one embodiment of the invention.
Figure 1C:
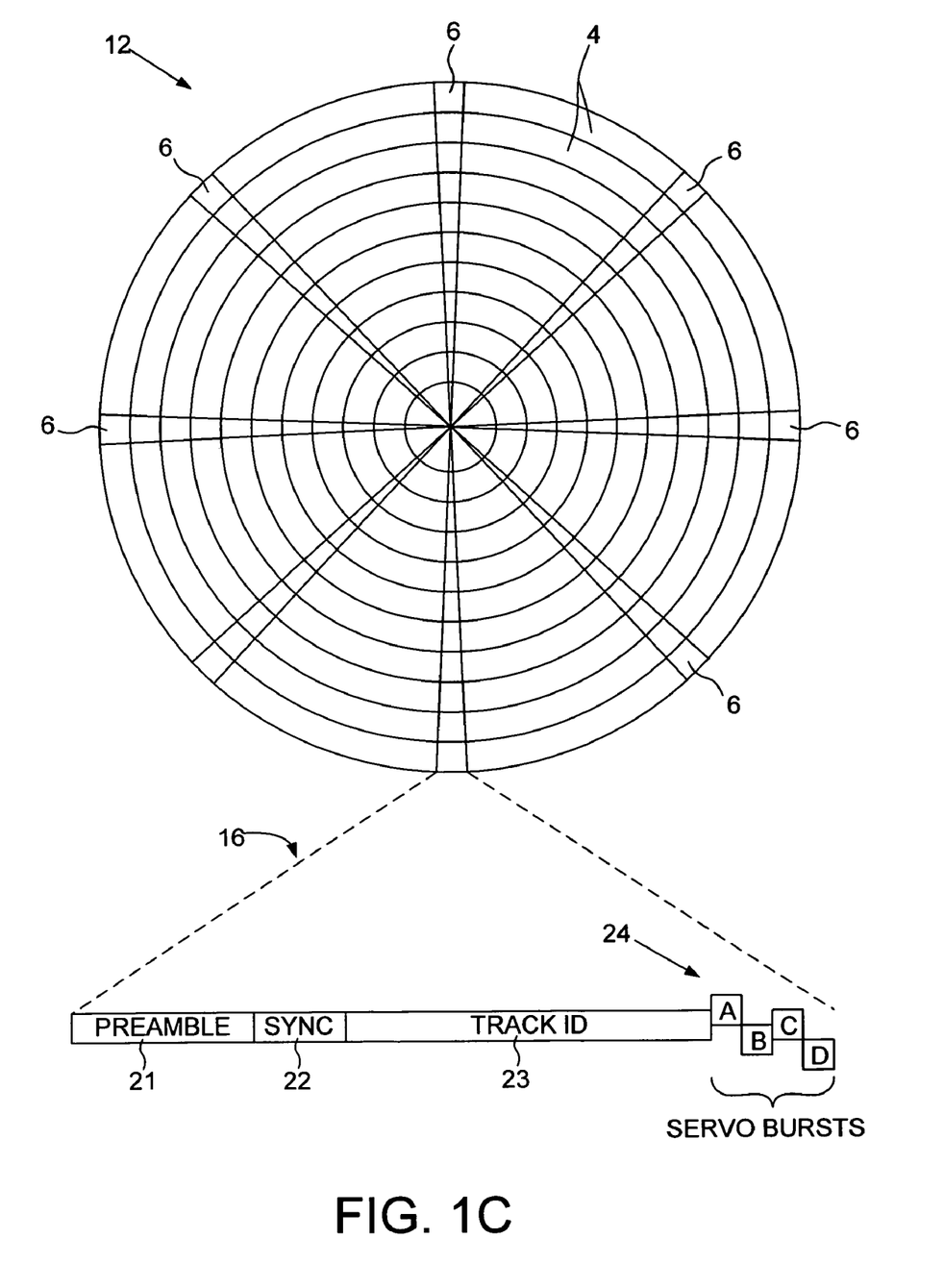
FIG. 1C illustrates a disk formatted for use with a disk drive employing an embodiment of the present invention.

FIG. 1C illustrates a disk 12 formatted for use with disk drive 10. The disk 12 comprises a plurality of radially-spaced, concentric tracks 4 which are partitioned into a plurality of data sectors. The disk 12 further comprises a plurality of embedded servo sectors 16 (sometimes called servo "wedges") disposed in wedge-like areas 6 on the disk for use in positioning head 140 over a desired track during write and read operations. A servo wedge 16 typically comprises a preamble field 21 for synchronizing timing recovery and gain control within a read channel, and a sync mark 22 for symbol synchronizing to a track identification field 23. As is known in the art, track identification field 23 is generally encoded using a Gray Code algorithm, which minimizes ambiguity when a head is situated over two such adjacent fields by guaranteeing only a single bit difference between adjacent encoded fields. An embedded servo sector 16 also typically comprises a plurality of servo bursts 24 recorded at precise offsets from a track's centerline to provide fine head positioning information to the servo control system.

The present invention mitigates the effects of head instability in data storage devices by adding robustness to the track identifier (id) processing performed in disk drive firmware. Characterization of servo failures indicates that most servo failures are due to single bit errors in the track id field of the servo wedge. Because we know that one bit errors occur most frequently, it is possible to modify the servo firmware to detect single bit, or more generally, N-bit track id errors that occur during the tracking mode to help cope with head instability. In order to do this, the drive firmware must distinguish between off-track errors and N-bit errors caused by head instability during track following. In one embodiment, the servo firmware can characterize single bit or multiple bit errors (i.e. N-bit mismatches) that result in a read-back track id that differs from the expected track id by more than a pre-determined threshold number of tracks (e.g. five tracks) and has a Hamming distance of one bit or a Hamming distance of a pre-configured number of bits (N) in the Gray code domain. The details on the Hamming distance computation are given in the equations below:

$r_k$=readback track id(Gray code)binary value $e_k$=expected track id(Gray code)binary value $H_k$=Hamming distance $r_k(i)=i^{th} \text{bit} r_k$ $e_k(i)=i^{th} \text{bit} e_k$ $$H_k = \sum_i [r_k(i) \oplus e_k(i)]$$

It will be apparent to one of ordinary skill in the art that a different track id differential threshold other than five may also be used. If this definition is applied, it is possible to distinguish between random N-bit errors in the track id caused by head instabilities and off-track errors caused by vibration or shock which would result in a rather specific track id change (typically to that of less than the pre-determined threshold number of tracks). This technique can be effective in mitigating missing and extra bit errors caused by head instability in the track id area.

In order to illustrate the invented technique in a system embodiment, a block diagram of an exemplary servo track id detection system suitable for use with the present invention is shown in FIG. 1B. The servo track id detection system can be implemented as part of the disk drive controller circuit board 14 shown in FIG. 1A. In one embodiment, the servo track id detection system is implemented partly in hardware and partly in software (i.e. firmware). Other embodiments employing the presently disclosed and claimed invention can similarly be implemented in purely hardware or software systems. Although changes can be made to the hardware architecture, it is also possible to cope with head instability errors with an effective error detection mechanism as provided by the present invention.

Referring to FIG. 1B, the general flow of track id information between disk 12 and servo firmware 110 is illustrated. In general, a channel read front end component 111 receives data from the disk 12 on a read channel. The track id detector 112, including a sampler and a threshold detector, obtains the track id from the read data. The Gray decoder 113 converts the received track id from the well-known Gray encoded format to a binary value. The decoded received track id is delivered to the servo firmware 110 and processed in the manner more fully described below. During disk formatting operations as may be performed by a conventional servowriter having servowriter firmware 117, the track id is typically encoded by Gray encoder 114, and written to disk 12 by channel write front end process 115.

The servo firmware 110 in FIG. 1B increments an error counter when it encounters an invalid track id value. In one embodiment of the firmware, the counter is incremented by, for example, 10 or some equivalent penalty value for each track id error encountered. Furthermore, a valid track id acts to balance against errors by decrementing 1 or some equivalent compensating value from a non-zero error count. An error counter limit is typically set at a value related to how much uncertainty the track following servo system can accommodate. In one embodiment, this limit, for example, is set between 50 and 100. In the presence of head instability, the error count is reached rather easily. Therefore, various embodiments of the present invention can use the processes described in more detail below to help cope with the errors.

Figure 2:
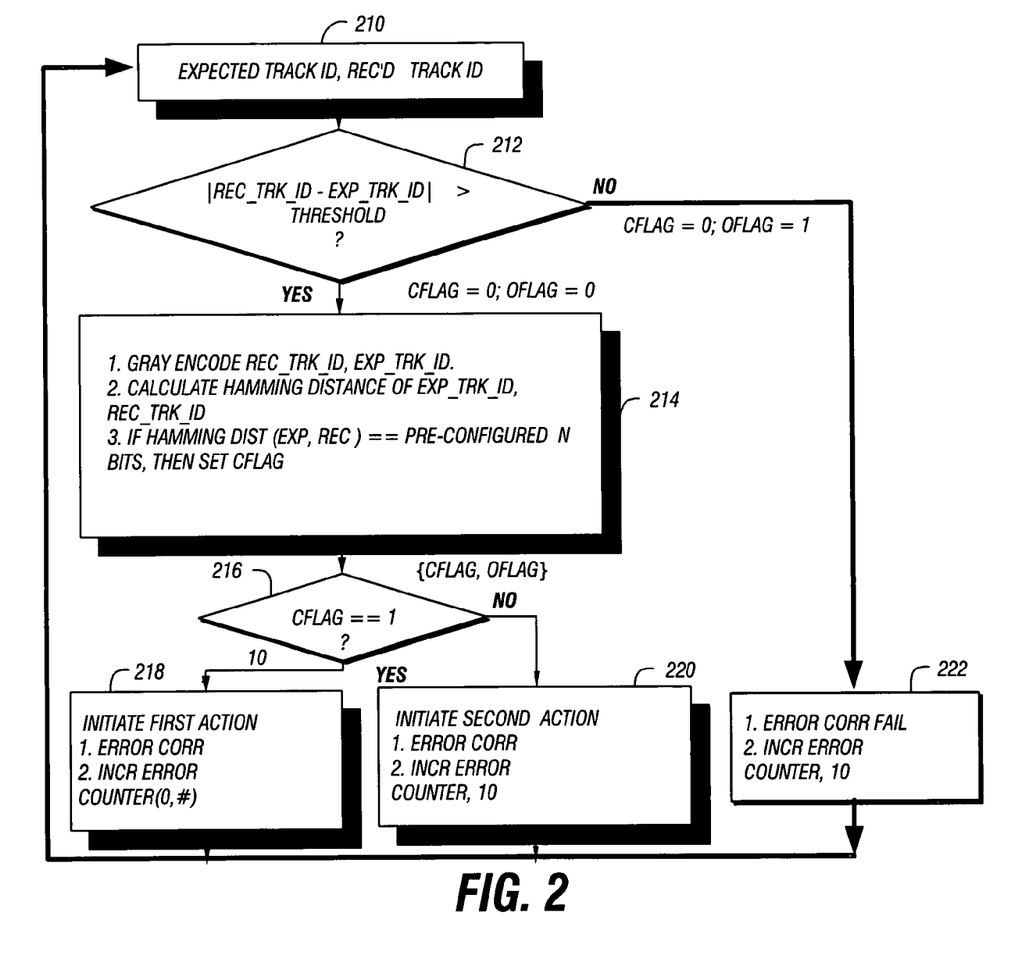
FIG. 2 illustrates a process used in one embodiment of the invention for correcting the effects of disk drive head instability.

The processes described herein and illustrated in FIG. 2 can be applied to both write and read off-track problems caused by head instability. In the case of head instability during a write operation, it is better to make doubly sure that one is not really off-track to avoid overwriting data accidentally. The process of one embodiment implemented in servo firmware 110 and shown in FIG. 2 calculates the absolute value of the differential between the received track id and the expected track id in block 212. An expected track id is a track id value expected in the operational context of the disk drive. For example, if a particular track id is read from a disk and no head movement is commanded, the same track id value previously read would be expected upon reading a subsequent servo wedge. Further, the expected track id can be predicted by an estimator component, which is a well-known component in disk drive art. The received track id represents the track id value most recently returned as read by the head. If head instability occurred during the read operation, the received track id may be corrupted. In block 212 shown in FIG. 2, the embodiment of the present invention determines if there is a difference between the received track id and the expected track id. This difference is denoted as the track id differential. A pre-determined threshold is configured based on empirical data and any suitable track id threshold may be used. The pre-determined threshold is based on the reasonable range of actuator movement. If the computed track id differential is greater than the pre-determined threshold (e.g. five tracks), then the process checks to see if the error, as computed in block 214, happens to be of the N-bit variety as compared between the Gray-encoded expected and received track id (by calculating the Hamming distance) before proceeding to log and/or correct the error.

In block 214 of one embodiment shown in FIG. 2, the received track id and expected track id are Gray encoded using Gray encoder 116 shown in FIG. 1B. The Hamming distance between the received track id and expected track id can then be calculated using well-known techniques. Then, if the Hamming distance between received track id and expected track id is one (indicating a one-bit differential), a correction flag (CFLAG) is set to indicate the presence of a correctable single bit error. In general, the embodiment of the present invention computes a Hamming distance to determine if there is a mismatch of a pre-configured N number of bits between the encoded received track id and the encoded expected track id. In this manner, the present invention can detect a one-bit, two-bit, or N-bit mismatch between the encoded received track id and the encoded expected track id. Based on this determination, the CFLAG is set or cleared accordingly. Next, the received track id can be corrected to the value of the expected track id in the presence of the N-bit error. In an alternative embodiment, the received track id can be left uncorrected and only the error flagged. Error counters are used to keep tabs on the number of correction and off-track failures. The error counters are incremented based on the setting of the CFLAG (Correction Flag) and OFLAG (Off-track Flag) bits. The OFLAG is set if the track id differential is not greater than the pre-determined threshold. This is typically the case if a track id error is the result of something other than head instability. If the OFLAG is clear and an N-bit error between the expected and received track id occurs, then {CFLAG, OFLAG}=10 and a first set of actions (block 218) is initiated. This is typically the case if a track id error is the result of head instability. The first actions may include correcting the error by setting the received track to the desired or expected (estimator value) track id, and recording a smaller penalty value by the error counter (block 218). On the other hand, if the error is not of the N-bit variety (block 220) between the expected and received track id (block 220) or the track id differential is less than or equal to the pre-determined threshold (e.g. five tracks) (block 222), then a second set of actions (block 220) is initiated. The second actions may include recording a full penalty value by the error counter. Once the error counter is updated, the setting of CFLAG and OFLAG are used to track the errors. This particular embodiment as shown in FIG. 2 attempts to "correct" for errors most likely to be head instability induced and leaves all other errors untouched.

Figure 3:
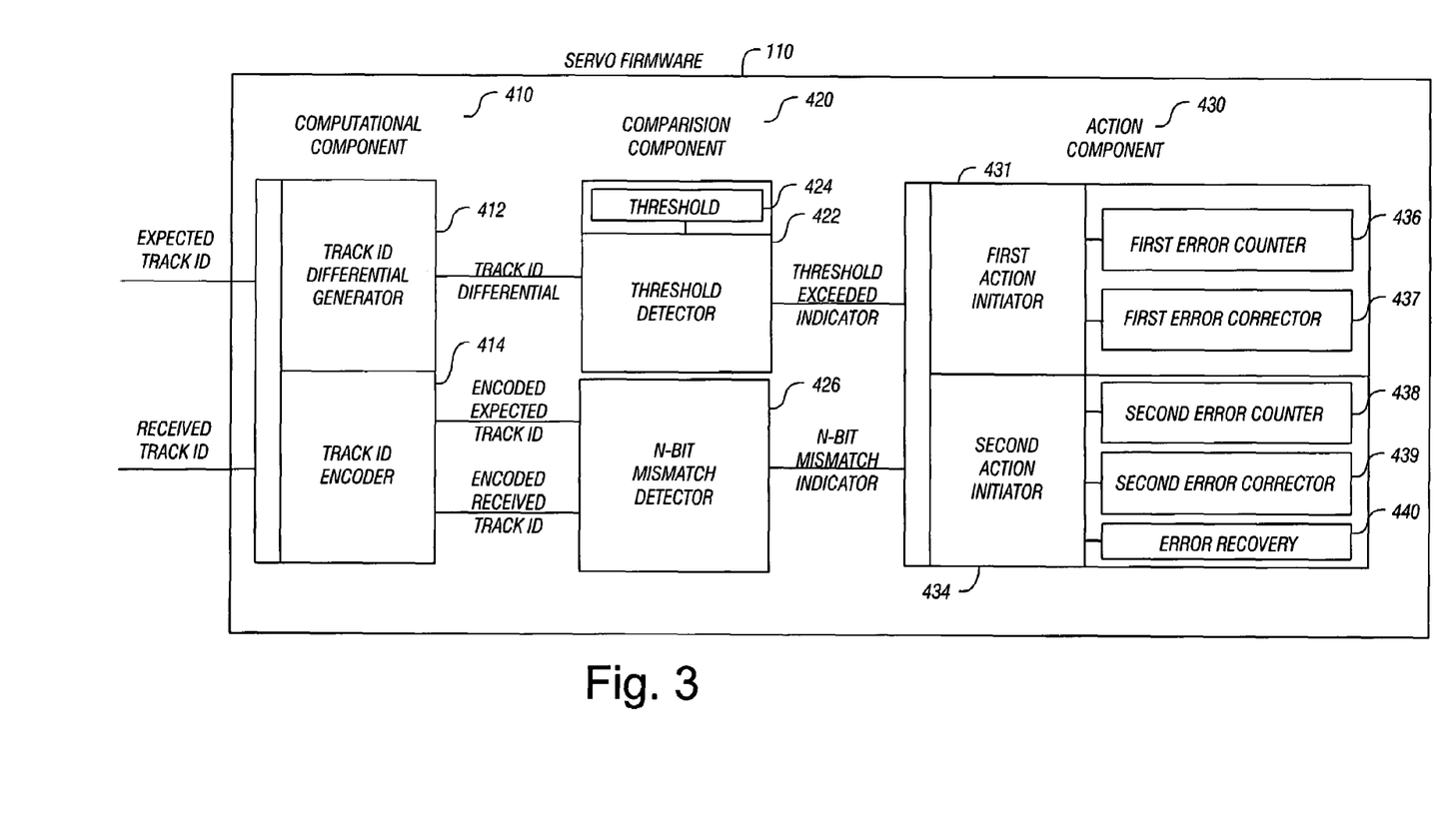
FIG. 3 illustrates the additional components of the servo firmware of one embodiment of the invention.

Referring now to FIG. 3, one embodiment of the present invention is illustrated. As shown in FIG. 3, a portion of servo firmware 110 can be divided into three basic components used by an embodiment of the present invention. These three components are computational component 410, comparison component 420, and action component 430 as shown in FIG. 3. In the manner described above, servo firmware 110 receives a received track id as read from disk 12. The received track id and the expected track id values are transferred to computational component 410. The track id differential generator 412 portion of computational component 410 computes the absolute value of the difference between the expected track id value and the received track id value. The resulting track id differential is provided as input to comparison component 420. The track id encoder 414 of computational component 410 encodes the expected track id and received track id into a conventional Gray code format and provides the encoded track id's as input to comparison component 420.

A threshold detector 422 of comparison component 420 receives the track id differential generated by computational component 410. The track id differential is compared with a pre-determined threshold value 424 pre-configured in comparison component 420 or another portion of servo firmware 110. If threshold detector 422 determines that the input track id differential is greater than the pre-determined threshold 424, a threshold exceeded indicator is output to action component 430. Otherwise, the threshold exceeded indicator output to action component 430 is cleared. The N-bit mismatch detector 426 of comparison component 420 receives the Gray encoded expected track id and Gray encoded received track id from computational component 410. Using conventional techniques, N-bit mismatch detector 426 computes a Hamming distance between the encoded expected track id and encoded received track id. If the computed Hamming distance indicates a mismatch of a pre-configured N number of bits between the expected track id and the received track id, an N-bit mismatch indicator is set and output to action component 430. Otherwise, the N-bit mismatch indicator output to action component 430 is cleared.

Action component 430 receives a threshold exceeded indicator from threshold detector 422 and N-bit mismatch indicator from N-bit mismatch detector 426. As a result of the values held by these indicators, action component 430 initiates one or more resulting actions to handle the potential error indicated by previous processing performed on the expected track id and received track id. It will be apparent to one of ordinary skill in the art that action component 430 may include a plurality of actions to be initiated upon the detection of various error events. In one embodiment, action component 430 triggers first action initiator 431 if the threshold exceeded indicator is set to true and the N-bit mismatch indicator is set to true. In this case, the presence of a head instability induced track id error has been detected. In response to the head instability error, first action initiator 431 records the error in a first error counter 436 and may initiate a first error corrector 437 process to correct the head instability error. For example, first error corrector 437 may set the received track id to the value of the expected track id thus correcting the head instability error present in the received track id. It will be apparent to one of ordinary skill in the art that other actions resulting from the detection of head instability errors may similarly be initiated by first action initiator 431. In one embodiment, action component 430 triggers second action initiator 434 if either the threshold exceeded indicator or the N-bit mismatch indicator is cleared or false. In this case, the presence of an error cannot necessarily be linked to the presence of head instability. In this case, second action initiator 434 records the error in a second error counter 438 and may either attempt error correction using a second error corrector 439 or a separate error recovery process 440 to handle the detected error. Again, it will be apparent to one of ordinary skill in the art that second action initiator 434 may trigger a variety of actions resulting from the detection of errors indicated by the threshold exceeded indicator and the N-bit mismatch indicator. Thus, as shown in FIG. 3, the additional functionality provided by the present invention may be used to detect various types of errors occurring in the reading of track id information from a disk drive system.

In this disclosure, we have described the nature of head instability and described solutions to help cope with head instability. Because drive data indicates that most track id errors are of the N-bit mismatch variety, we have provided a modification to the disk drive servo firmware in tracking mode to help cope with track id failures.

Thus, a system and method for processing track identifier errors to mitigate head instability in data storage devices is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

We claim:

1. A method, comprising:
   reading a received track id from a disk;
   computing a track id differential between the received track id and an expected track id;
   Gray encoding the received track id and the expected track id, wherein the Gray-encoded received track id and the Gray-encoded expected track id each comprise a plurality of bits;
   detecting any mismatch between the bits of the Gray-encoded received track id and the bits of the Gray-encoded expected track id;
   initiating a first action if the track id differential exceeds a pre-determined threshold and the mismatch between the bits of the Gray-encoded received track id and the bits of the Gray-encoded expected track id is of a pre-configured number of bits; and
   initiating a second action if the track id differential exceeds a pre-determined threshold and the mismatch between the bits of the Gray-encoded received track id and the bits of the Gray-encoded expected track id is not of a pre-configured number of bits.

2. The method of claim 1, wherein the first action includes recording an error using a first penalty value.

3. The method of claim 2 wherein the second action includes recording an error using a second penalty value.

4. The method of claim 1 wherein the first action includes correcting the received track id.

5. The method of claim 1, wherein the second action includes performing an error recovery operation.

6. The method of claim 1, wherein detecting any mismatch between the bits of the Gray-encoded received track id and the bits of the Gray-encoded expected track id comprises computing a Hamming distance between the Gray-encoded received track id and the Gray-encoded expected track id.

7. The method of claim 1, wherein the pre-configured number of bits is one bit.

8. The method of claim 1, wherein the pre-configured number of bits is two bits.

9. A disk drive, comprising:
   a track id detector operable to read a received track id from a disk;
   a track id differential generator operable to determine a track id differential between the received track id and an expected track id;
   a track id encoder operable to Gray-encode the received track id and the expected track id, wherein the Gray-encoded received track id and the Gray-encoded expected track id each comprise a plurality of bits;
   an N-bit mismatch detector operable to detect any mismatch between the bits of the Gray-encoded received track id and the bits of the Gray-encoded expected track id;
   a first action initiator operable to initiate a first action if the track id differential exceeds a pre-determined threshold and the mismatch between the bits of the Gray-encoded received track id and the bits of the Gray-encoded expected track id is of a pre-configured number of bits; and
   a second action initiator operable to initiate a second action if the track id differential exceeds a pre-determined threshold and the mismatch between the bits of the Gray-encoded received track id and the bits of the Gray-encoded expected track id is not of a pre-configured number of bits.

10. The method of claim 9, wherein the first action includes recording an error using a first penalty value.

11. The method of claim 10 wherein the second action includes recording an error using a second penalty value.

12. The method of claim 9 wherein the first action includes correcting the received track id.

13. The method of claim 9, wherein the second action includes performing an error recovery operation.

14. The method of claim 9, wherein the N-bit mismatch detector is further operable to compute a Hamming distance between the Gray-encoded received track id and the Gray-encoded expected track id.

15. The method of claim 9, wherein the pre-configured number of bits is one bit.

16. The method of claim 9, wherein the pre-configured number of bits is two bits.

* * * * *